(Specimens.)

A. F. PRITSCHAU.
POLISHING AND ABRASIVE MATERIAL.

No. 574,449. Patented Jan. 5, 1897.

Witnesses:
R. S. Hunzeker.
J. N. Wall

Inventor,
Arthur F. Pritschau
by J. H. Stevenson
Atty.

UNITED STATES PATENT OFFICE.

ARTHUR F. PRITSCHAU, OF PITTSBURG, PENNSYLVANIA, ASSIGNOR OF ONE-HALF TO ALBERT PETTIT, OF SAME PLACE.

POLISHING AND ABRASIVE MATERIAL.

SPECIFICATION forming part of Letters Patent No. 574,449, dated January 5, 1897.

Application filed December 16, 1895. Serial No. 572,302. (Specimens.)

*To all whom it may concern:*

Be it known that I, ARTHUR F. PRITSCHAU, a citizen of the United States, residing at Pittsburg, in the county of Allegheny and State of Pennsylvania, have invented certain new and useful Improvements in Polishing and Abrasive Materials; and I do declare the following to be a full, clear, and exact description of the invention, such as will enable others skilled in the art to which it appertains to make and use the same, reference being had to the accompanying drawings, which form a part of this specification.

My invention relates to a new article of manufacture for abrasive polishing and scouring purposes, and will be particularly described hereinafter.

Figure 1:
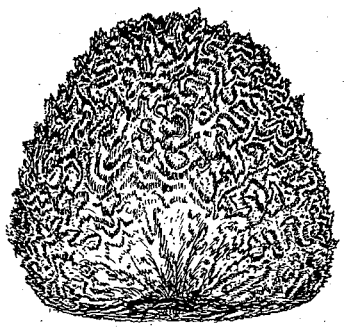
Figure 2:
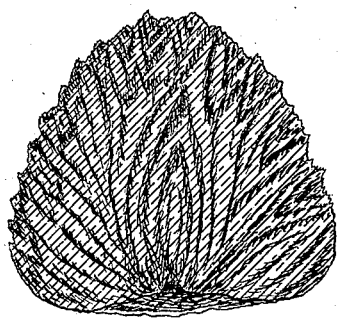

In the accompanying drawings, Figure 1 represents a sponge treated and prepared according to my invention, and Fig. 2 is an imaginary cross-section of such sponge.

I now desire to more minutely show how I prepare the mixture and how I accomplish the production of the polishing material.

Abrasive powder, used by me to carry out my invention, may be had from emery, carborundum, flint, pumice-stone, or corundum, crushed or reduced to a powder. In addition to the above the following substances may also be used for the same purpose—viz., carbonate of magnesium, tripoli, French chalk, iron filings or scales, rottenstone, bran, &c. For my purpose of course said substances are to be also reduced to powder. Having such a powdered abrasive provided, I next take an ordinary sponge, moderately dampen the same, and put it into a suitable vessel containing one or a mixture of one or more of said abrasives, and to thoroughly fill the pores and cells of the sponge with the abrasive I cause the sponge to be agitated or shaken properly while in the vessel. Having treated the sponge in this manner, another treatment is necessary to perfect the article for the purpose intended. This I accomplish by a mixture of caoutchouc, sulfur, and some coloring-matter. As an illustration, I take a quantity of caoutchouc, say twenty-six parts, cut the same up into small bits, and put into a suitable vessel containing four to five hundred parts of benzene or some other good solvent. This being done I close the lid airtight, set the vessel aside for a few days, but I agitate the contents now and again. When it is found that the caoutchouc is thoroughly dissolved, I add from one to two parts of sulfur for vulcanizing purposes and from fifty to two hundred and fifty parts of any of the abrasive, polishing, or scouring material. The greater the specific gravity of these abrasives the larger, of course, should be the number of parts added. The parts are given by weight only. For coloring-matter I use chrome-yellow, vermilion, yellow ocher, lampblack, or any other suitable pigment.

The mixture aforesaid will be thick or thin, according to the quantity of benzene contained therein. I make it thick when I wish to impregnate the sponges with a large quantity of the mixture and thin when a smaller quantity is desired. The proper mixture being thus provided in a suitable vessel, I place the sponges treated as aforesaid therein, close the vessel air-tight, and while the saturation is going on to hasten the same I shake the vessel once in a while, and when the sponges are thoroughly saturated with the mixture I take them out and place them on a wire screen or on slats to be dried. While this drying is going on I cause the sponges to be turned frequently to prevent the mixture from dripping off. Before the sponges are quite dry, when still damp, in fact, I put them in a vessel containing more abrasive material of the same kind and shake or agitate them again therein. After thus subjecting the sponges to the operation just described to gather more abrasive material I take them out and again lay them on a wire-screen or slats to be thoroughly dried. After being so dried I put them in a vessel or perforated revoluble cylinder to shake off the excess of abrasive material. Then comes the last operation, and this consists of vulcanizing the sponges thus prepared. This requires from ten to twenty minutes at a temperature of about 260° to 285° Fahrenheit.

After vulcanizing the sponges should be soft and pliable.

Having thus described my invention, what I claim, and desire to secure by Letters Patent, is—

As a new article of manufacture an abrasive polishing and scouring material consisting of an ordinary sponge combined with and filled with a mixture of caoutchouc, sulfur and an abrasive powder, vulcanized, substantially as described.

In testimony whereof I affix my signature in presence of two witnesses.

ARTHUR F. PRITSCHAU.

Witnesses:
 J. K. BARBOUR,
 G. W. BRUNER.